Jan. 1, 1952

G. W. BORKLAND 2,580,883

APPARATUS FOR HEATING AND PRESSING
THERMOPLASTIC SHEET MATERIAL

Filed Sept. 4, 1948

INVENTOR.
Gustave W. Borkland
BY
Thiess, Olson &
Mecklenburger, Attys.

Jan. 1, 1952 G. W. BORKLAND 2,580,883
APPARATUS FOR HEATING AND PRESSING
THERMOPLASTIC SHEET MATERIAL
Filed Sept. 4, 1948 5 Sheets-Sheet 2

Fig. 2.

INVENTOR.
Gustave W. Borkland.
BY
Thiess, Olsen & Mecklenburger.
Attys.

Patented Jan. 1, 1952

2,580,883

UNITED STATES PATENT OFFICE 2,580,883

APPARATUS FOR HEATING AND PRESSING
THERMOPLASTIC SHEET MATERIAL

Gustave W. Borkland, Marion, Ind.

Application September 4, 1948, Serial No. 47,808

15 Claims. (Cl. 18—19)

My invention relates to time-controlled apparatus for heating and pressing thermoplastic sheet material.

One of the objects of my invention is to provide automatic apparatus into which the frames carrying the thermoplastic sheet may be fed by the operator, which apparatus will cause the sheet fed thereto to be subjected to a predetermined heating temperature for a predetermined length of time, advanced from this heating station to a position underneath a die-operating ram, operated on by the ram, subjected to a cooling temperature for a predetermined time, then removed from the position underneath the die-controlling ram and moved to a delivery station, and the frame carriage thence returned to its original position ready to receive another sheet to be similarly processed.

A further object is to provide such a construction in which the delivery station is adjacent the feed-in station so that the operator can remain substantially in one position while feeding and removing the sheets.

Further objects and advantages of the invention will be apparent from the description and claims.

In the drawings in which an embodiment of my invention is shown.

The construction shown comprises manually-operated means 1 for securing thermoplastic sheets to marginal sheet-supporting frames, a reversible conveyor 2 for receiving these frames with the sheets mounted thereon, a heating station 3 adjacent the path of said conveyor 2 for heating the plastic sheets 4 to ductility and formability, cylinder and piston means 5 for effecting forward and reverse movement of said conveyor, manually-initiated timing means 6 for starting the heating period, terminating it at the end of a predetermined time, and putting the piston in motion to cause the conveyor 2 to move forward at the end of the heating period, a forming element 7 opposite which the sheet 4 is carried by the conveyor, cylinder and piston means 8 controlled by the movement of the sheet into opposite position for effecting relative forming movement between the forming element and sheet, means 9 controlled by the relative position of the sheet and forming element to apply cooling air to the sheet or to apply pressure to hold the sheet against the die, time-controlled means 10 for limiting the cooling period to a predetermined length and for starting the first piston and conveyor to move in a reverse direction to move the frame 11, carrying the formed sheet to a discharge station and to return the conveyor means to original position to receive another frame-mounted sheet, and means comprising a bleeder valve 12 controlled by the action of the first cylinder and piston means for causing air to be applied to free the frame-mounted formed sheet 13 (Fig. 3) from the forming element.

The manually-operated means for securing the thermoplastic sheets 4 to the frames 11 comprise an L-shaped positioning gauge 14 having an overhanging flange 15 underneath which the edges of the two adjacent sides of the frame 11 are inserted to hold the frame down against any lifting action, and a manually-operated presser plate 16 having a rectangular groove 17 in its lower face to receive the rectangular arrangement of piercing pins 18 extending upwardly from the rectangular frame. In mounting the sheet on the frame 11, the sheet 4 is placed above the frame resting on the rectangular arrangement of pins 18, and the presser plate 16, rockably mounted at 19, is brought down on the thermoplastic sheet, causing the upwardly-extending pins 18 to pierce the sheet, thus holding it firmly stretched on the rectangular frame. A coil return spring 20 is provided to raise the presser plate after it has been pressed down to secure the sheet on the frame.

Figure 1:
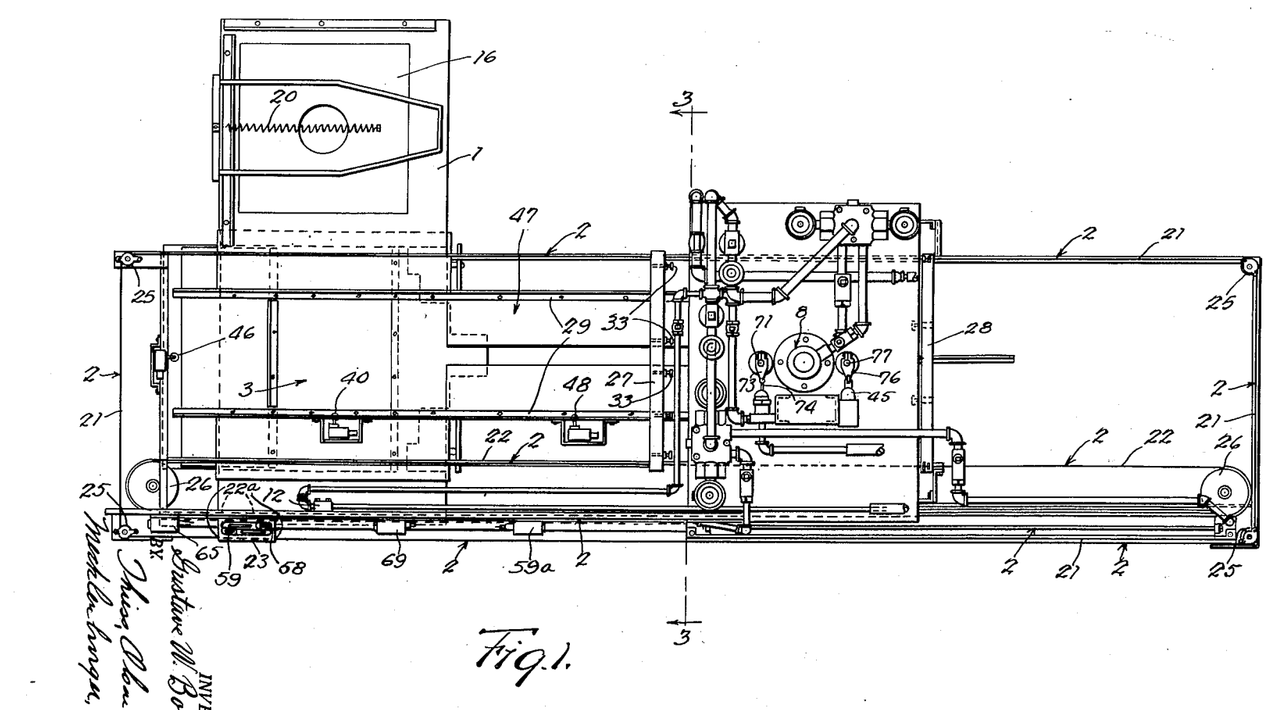
Figure 1 is a plan view of sheet-processing apparatus.
Figure 2:
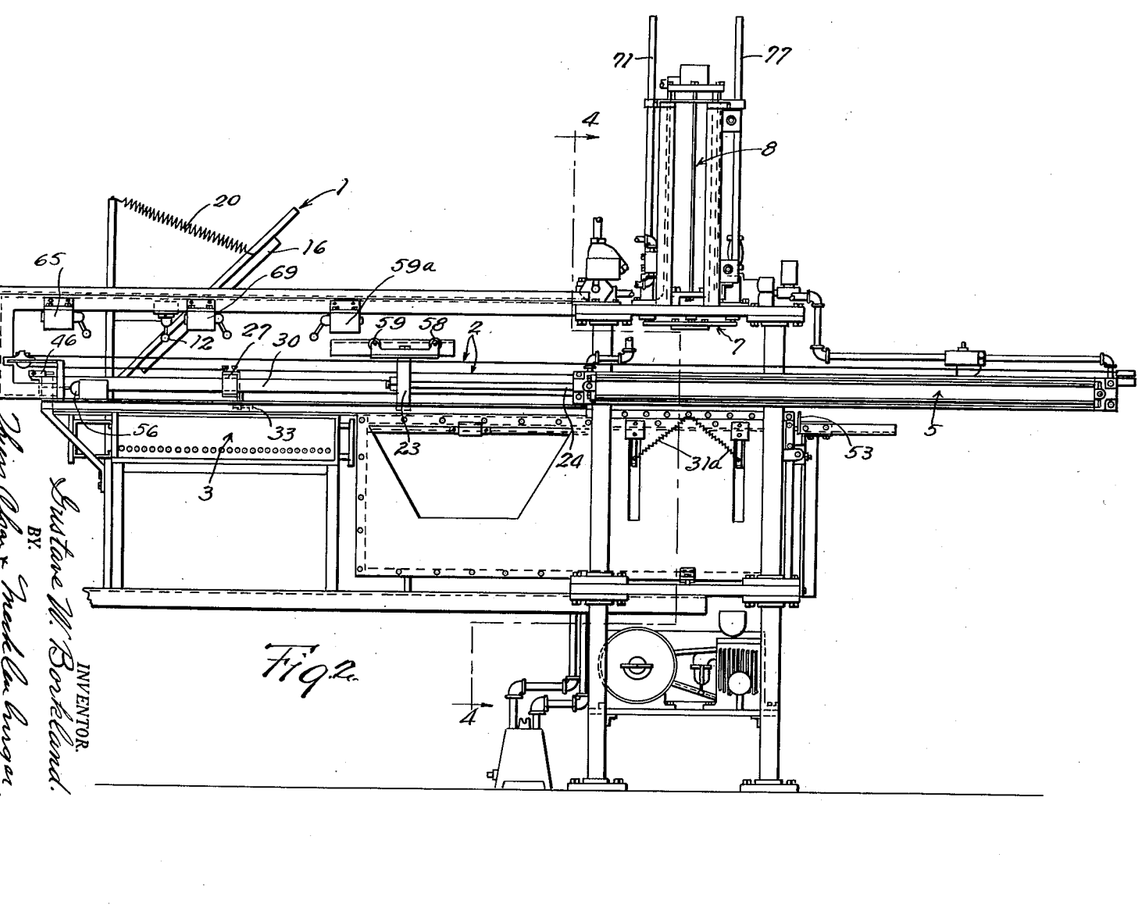
Fig. 2 is a view from the left of Fig. 3.
Figures 3, 9, 10:
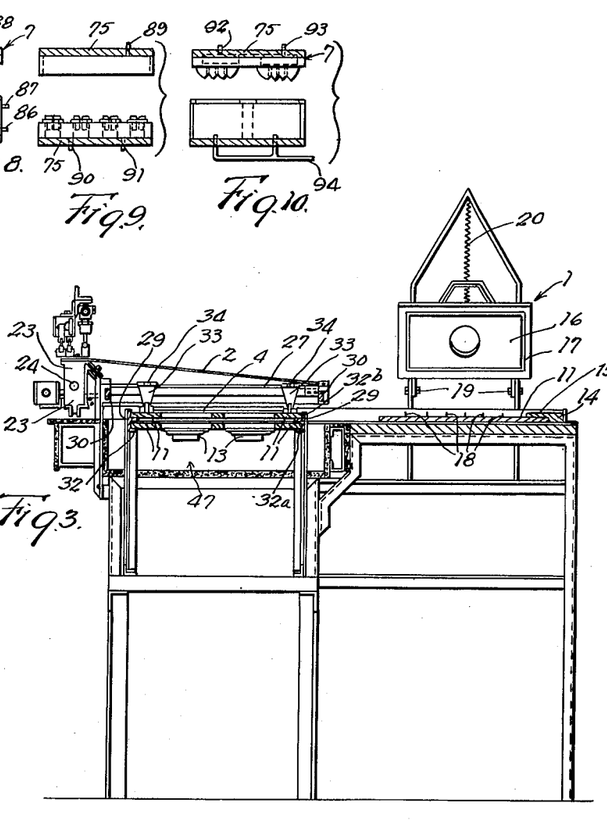
Fig. 3 is a section on the line 3—3 of Fig. 1.
Fig. 9 is a sectional view showing another die construction.
Fig. 10 is a sectional view showing another die construction.
Figures 4, 8:
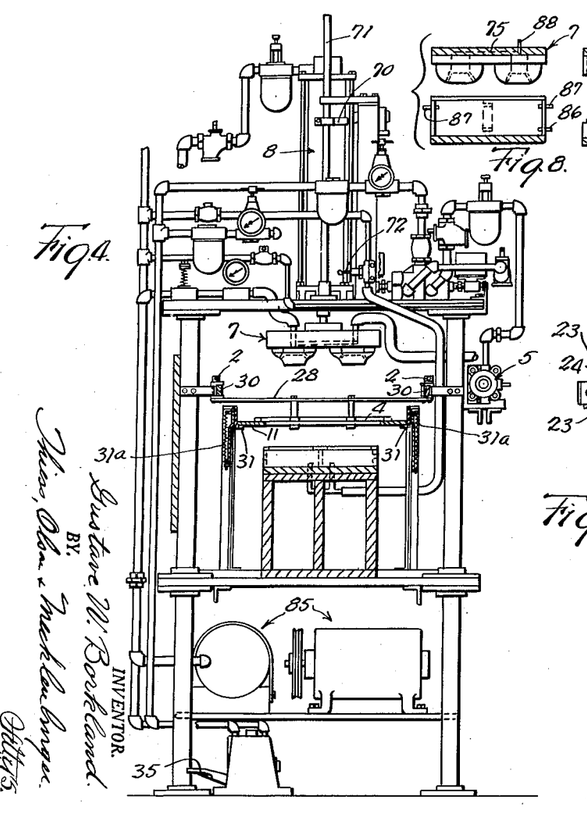
Fig. 4 is a section on the line 4—4 of Fig. 2.
Fig. 8 is a sectional view showing a die construction.

The reversible conveyor comprises two belt-like members 21 and 22, both secured at both ends 22ᵃ to the ram or plunger 23 secured to the outer end of the piston rod 24. One of the belt-like or cable members 21 travels over and is guided by four small pulleys 25, one at each corner of the frame of the apparatus as shown in the plan view of Fig. 1. The other belt-like member or cable 22 travels over and is guided by two relatively large pulleys 26 located at opposite ends of the supporting frame. Both ends of both cables 21 and 22 are secured to the ram 23, Two transversely-extending pusher bars 27 and 28 (Fig. 1) are secured to these two cables so as to extend therebetween and across and above the feed-in tracks 29 on which the sheet-carrying frames 11 are placed. These pusher bars are slidably mounted to travel on tracks 30 (Figs. 1, 3 and 4). One of these pusher bars 27 is for pushing the frame 11 carrying the plastic sheet along the tracks 29 from the heating station 3 onto "jumping jack" tracks 31 yieldingly supported by springs 31ª (Figs. 2 and 4) underneath the forming element 7. The other pusher bar 28 is for engaging the forward edge of the sheet-carrying frame after it has been acted on by the forming element 7 and pushing the frame carrying the formed element 13 backwardly from the platen 31 underneath the forming element 7 and onto the discharge tracks 32 and 32ª (Fig. 3) which are located underneath the feed-in tracks 29 and on a level with the raised position of the spring-supported tracks 31. As the forward feed bar 27 slides the frame 11 from the tracks 29 onto the spring-supported tracks 31, the front edge of the frame tips downwardly and rests on the tracks 31 and finally the rear edge of the frame drops from the front edge of the tracks 29 onto the tracks 31. When the forming element 7 is moved down for the forming operation, the yielding springs 31ª cushion the impact and provide some leeway for the movement of the forming element. As shown in Figs. 2 and 4, the springs 31ª are coil tension springs secured at their upper ends at a fixed point of the frame of the machine and at their lower ends to bars extending downwardly from the tracks 31.

Figure 5:
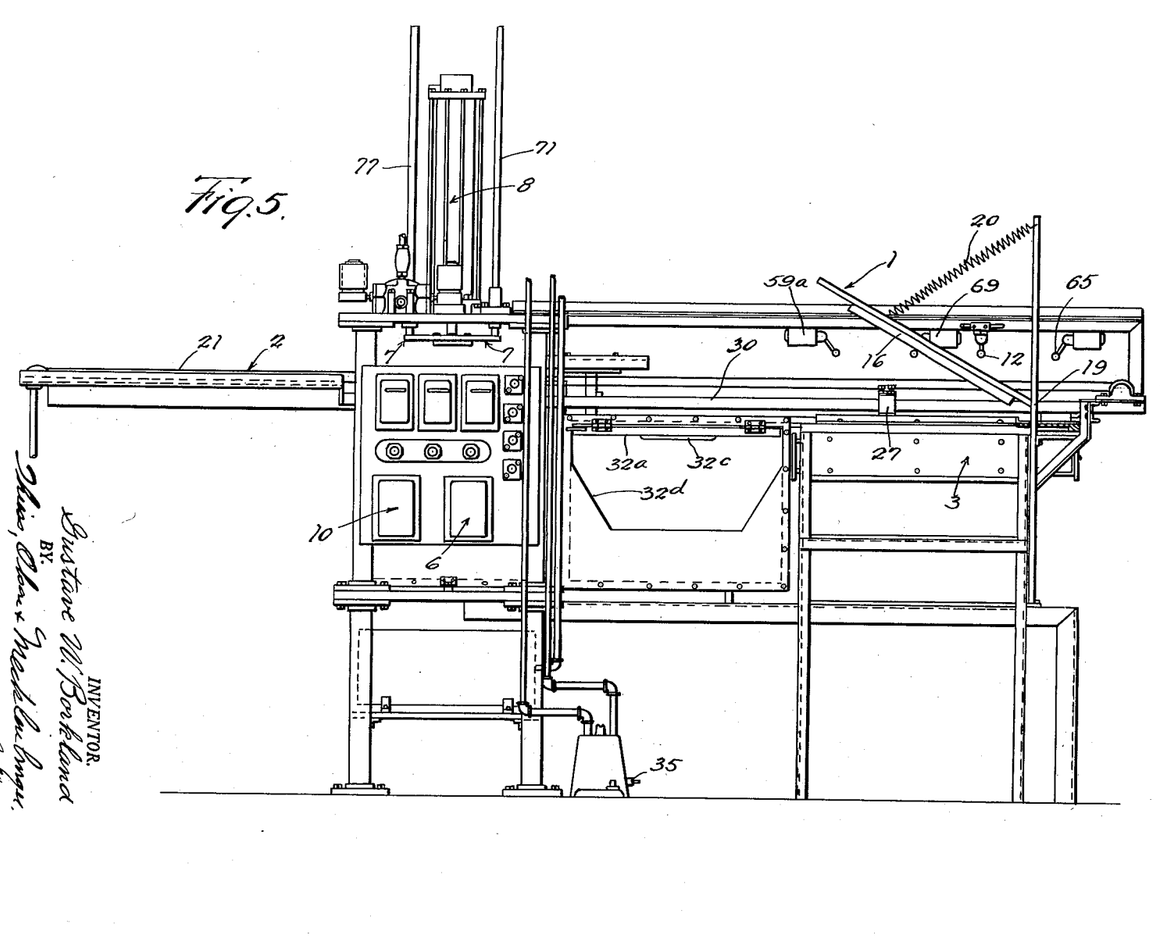
Fig. 5 is a view from the right of Fig. 3.

In order to free the sheet-holding frame 11 from the rails 32 and 32ª at the discharge station, one of the rails 32ª (Figs. 3 and 5) is pivoted to swing about a longitudinal axis on the hinges 32ᵇ adjacent its upper edge to enable the operator to swing this rail outwardly by means of the hand plate 32ᶜ so that the edge of the frame nearest the operator will drop down and the frame will free itself from the rails 32 and 32ª so that the frame can be readily removed through the discharge opening at 32ᵈ.

The feed-in pusher bar 27 carries a plurality of downwardly-extending pusher fingers 33 which are mounted for limited rocking or hinged movement at 34 on the pusher bar. This rocking movement enables the fingers to rise upwardly and ride over the advance edge of a frame and sheet which may be in position in the heating station when the pusher bar is returning to initial position and enables the pusher fingers to drop down behind the rear edge of the sheet-carrying frame when the pusher bar has been moved to its extreme withdrawn position. The pusher bars 27 and 28 are spaced far enough apart so that there is a considerable amount of lost motion of the ejecting pusher bar 28 from the beginning of its movement toward the frame to be ejected until the position where the pusher fingers engage the advance edge of the frame to be ejected. This enables such timing that the forming element 7 may be raised high enough to clear the pusher bar 28 as it moves underneath this forming element.

Figure 7:
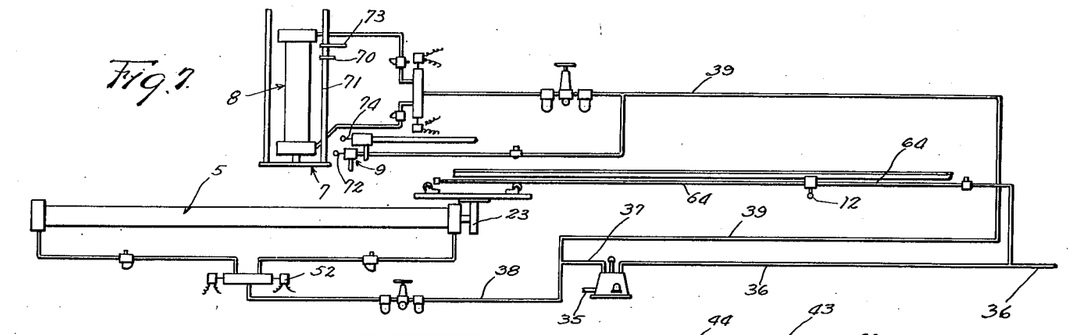
Fig. 7 is a diagrammatic view showing the air conduits for the apparatus.

Before starting operations the operator will press down on the foot valve 35. If the forming element 7 is not in raised position and the pusher bar 27 is not in its extreme withdrawn position, this depression of the foot valve will cause the cylinder and piston means 8 to act to return the forming element 7 to raised position and to return the pusher bar to its extreme withdrawn position by the admission of air from the supply 36 through the pipes or conduits 37, 38 and 39 shown in Fig. 7.

The passage of the frame-supported plastic sheet through the heating station onto the "jumping jack" platen and, reversely, from the "jumping jack" tracks or platen 31 (Fig. 4) onto the discharge tracks, and the heating, forming, cooling, stripping and discharge treatment to which it is subjected is controlled by different types of control, including that effected by the operator's insertion and removal of the framed sheets, the engagement of control devices by the sheet-carrying frame in its movement, the engagement of control devices by actuators carried by the ram 23 in its movement, the engagement of control devices by actuators carried by the piston rod of the cylinder 8 which controls the forming operation, and the engagement of a control device by the feed-in pusher 27 in its return movement.

Figure 6:
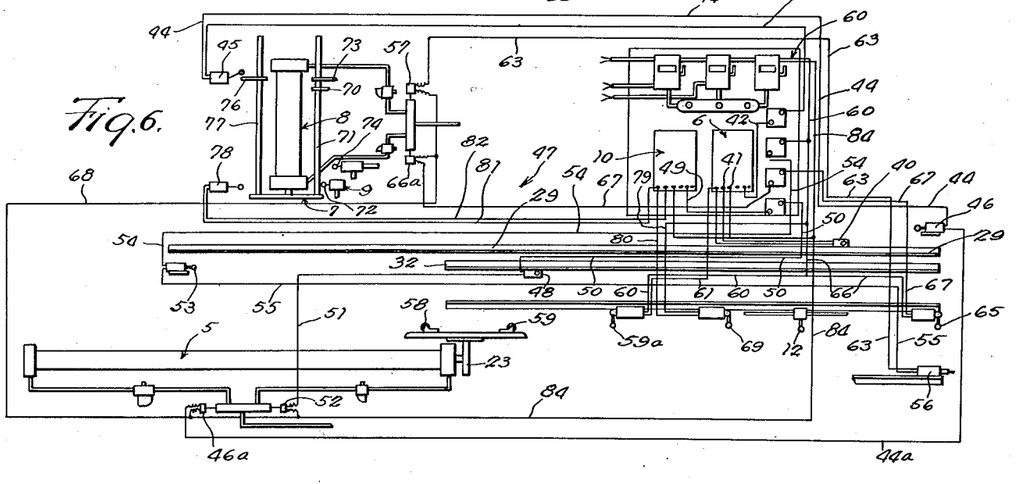
Fig. 6 is a diagrammatic view showing the wiring for the apparatus.

Reference will be made, first, to control by the operator's insertion and removal of the frame 11 carrying the sheet 4. The insertion of the framed sheet into the heating chamber at 3 to extend between the guide rails 29 operates the microswitch 40 (Figs. 1 and 6) controlling the conductors 41 and initiates the operation of the heating timer 6 which starts and terminates the heating period and, through the conductors 42, 43 and 44, limit switch 45, microswitch 46, and conductor 44ª, thus energizes the solenoid 46ª to start the conveyor-operating ram 23 on its feeding-in movement at the termination of the heating period. The removal of the frame 11 at the discharge station, at 47, after it has been acted on by the forming die, actuates the microswitch 48 and closes the circuit 49, 50 and 51 between the cooling timer 10 and a solenoid 52 which controls the conveyor-actuating ram 23, conditioning the solenoid circuit for energization at the end of the cooling period to effect the return movement of the ram 23.

Reference will now be made to the engagement of control devices by the sheet-carrying frame in its movement. At the end of the feed-in movement of the pusher 27 the front edge of the sheet-carrying frame engages a microswitch 53 which closes the circuit between the line 54 and conductor 55, thus conditioning the limit switch 56 for energizing the solenoid 57 which controls the downward movement of the forming die 7. This enables the limit switch 56, when actuated by the ram 23 on its return stroke, to energize the solenoid 57 to start the movement of the piston which actuates the forming element 7.

As the ejector pusher 28 pushes the frame 11 carrying the formed sheet from the "jumping jack" tracks 31 onto the discharge tracks 32, the frame 11 engages the microswitch 48 to break the circuit 49, 50 and 51 between the cooling timer 10 and the solenoid 52 of the conveyor ram, preventing any succeeding feeding-in movement of the conveyor cylinder until the operator has removed the frame from engagement with the microswitch 48 as described above.

The controls effected by the control devices carried by the ram 23 of the conveyor-actuating cylinder will now be described. The ram has two cam-like portions 58 and 59. The cam 58 on the outward movement of the ram engages the limit switch 59ª which connects line 60 with conductor 61 and thus resets the heat control timer 6. On the return movement of the ram this cam element 58 by-passes all the control elements.

The ram 23 on its outward movement engages the limit switch 56 which connects the solenoid 57 of the press cylinder 8 with line 54, 55 through the conductor 63 and causes the press ram 7 to move down if there is a frame under the ram in engagement with the microswitch 53 as described above.

On the return movement of the ram 23 it engages the bleeder valve 12 which causes stripping air to be applied to the die from the supply 36 through the conduit 64 to strip the formed sheet and its frame from the die. The cam 59 bypasses all of the control devices on the outward movement of the ram but on the return movement engages the limit switch 65, causing the press piston to move up if the previous frame has been disengaged from the microswitch. This is accomplished by establishing a circuit for the ram-elevating solenoid 66$^a$ through the conductors 60, 66 and 67, solenoid 66$^a$, conductor 68, solenoid 52, conductor 51, microswitch 48, and conductors 50 and 49 to the cooling timer 10. With this set-up, if the frame carrying the previously-formed sheet has been removed from engagement with the microswitch 48, when the cooling timer runs out, the solenoid 66$^a$ will be energized to cause the ram 7 to rise. This cam 59 also contacts the limit switch 69 which resets the cooling timer 10.

The controls effected by the control devices carried by the piston of the press cylinder 8 will now be described. These comprise a valve actuator 70 mounted on a rod 71 extending upwardly from the ram 7 which engages a valve 72 which turns on the cooling air from the pipe 39, an actuator 73 also carried by the ram 7 which engages a valve 74 to control the connection of the die 75 with vacuum, and a switch actuator 76 mounted on a rod 77 extending upwardly from the ram 7 which cooperates with a lower limit switch 78 to start the cooling timer 10 by completing a circuit from the line to the cooling timer through the conductors 60 and 79, limit switch 69, conductors 80 and 81, limit switch 78, and conductor 82 and which cooperates with the upper limit switch 45 at the upper end of its movement to condition the circuit controlled by the heating timer 6 for initiating the outward movement of the conveyor-operating ram 23 by completing the circuit from the line to the heating timer 6 through the conductors 42 and 43, switch 45, conductor 44, switch 46, conductor 44, solenoid 46$^a$ and conductor 84.

I will now describe the control by the microswitch 46. This is engaged by the feed-in pusher 27 on its return to its extreme inward position. It conditions the circuit to enable the heating timer 6 to start the outward movement of the ram 23 to effect the feed-in movement of the plastic sheet by connecting the conductors 42, 43 and 44 from the timer 6 with the conductor 44$^a$ leading to the solenoid 46$^a$ which initiates the outward movement of the ram 23.

Microswitches 46, 48 and 53 may be considered as safety switches. The microswitch 53 will prevent the operation of the press ram 7 unless a frame is engaging the microswitch 53 and holding a sheet under the ram 7. The microswitch 46 will prevent the operation of the frame advancing ram 23 unless the frame advancing carriage 27 is in withdrawn position in engagement with switch 46, even though a frame has been placed in position to engage the starting microswitch 40. The microswitch 48 will prevent the return movement of the ram 23 until the operator removes the frame on the rails 32, 32$^a$ to clear the circuit for the ram return solenoid 52.

Any suitable drive motor, pump, and tank may be provided, as indicated in general at 85, for supplying compressed air to the dies and power cylinders 5 and 8.

Figs. 8, 9 and 10 show different forms of upper and lower die members. Fig. 8 shows the cooling and pressure air as supplied to the lower die member at 86 and 87, respectively, and the stripping air as supplied to the upper die member at 88. Fig. 9 shows the lower die member as the forming member. It shows the cooling air as supplied to the upper die member at 89, and the stripping air and vacuum as supplied to the lower die member at 90 and 91, respectively. Fig. 10 shows the stripping air and vacuum supplied to the upper die member at 92 and 93, respectively, and the cooling air as supplied to the lower die member at 94.

The operation of the apparatus may be divided roughly into ten stages as follows:

1. The operator steps on the air control pedal 35 to cause the rams 7 and 23 to return to starting position.

2. The operator places a frame on which is mounted a sheet of thermoplastic material in position in the heating station, bringing the frame into engagement with the microswitch 40, thus starting the heating timer 6.

3. The heating timer runs out, causing the energization of the solenoid 46$^a$ and the outward movement of the ram 23.

4. The cam 59 on the ram 23 engages the limit switch 59$^a$ resetting the heating timer 6.

5. The ram 23 at the end of its stroke causes the feeding pusher 27 to push the sheet-carrying frame against the microswitch 53, thus conditioning the circuit which controls the cylinder 8 and ram 7.

6. The ram 23 at the end of its stroke engages the limit switch 56 (Figs. 2 and 6), causing the ram 7 to descend.

7. At the lower end of the stroke of the ram 7, the push fingers 70, 73 and 76 (Figs. 6 and 7) engage the air pressure valve 72, vacuum valve 74, and limit switch 78, respectively, effecting, respectively, the application of cooling air to the sheet, the application of vacuum to cause the sheet to fit snugly against the die surfaces, and the putting in operation of the cooling timer 10.

8. Prior to the return movement of the ram 23, the operator must remove the frame carrying the previously-formed sheet from its position on the return tracks 32 and 32$^a$ in which it engages the microswitch 48. This clears the circuit so that when the cooling timer 10 runs out, it effects the energization of the solenoid 52, causing the ram 23 to return to its original position, as at the end of operation 1. If it were not for the microswitch 48, the running out of the cooling timer might cause the last-formed sheet to jam into the previously-formed sheet.

9. On the return stroke of the ram 23 the cam 59 engages the limit switch 65 to start the press ram 7 on its upward movement, and at the same time the ram 23 engages the valve 12 which causes stripping air to be applied to strip the formed sheet from the die. The disengagement of the push fingers 70 and 73 from the valves 72 and 74 enables the valves to return to their initial position, cutting off the air supply and vacuum.

10. Continued return movement of the ram 23 brings the cam 59 into engagement with the limit switch 69 which resets the cooling timer 10.

Any usual feed and discharge apparatus, driven in timed relation to the movement of the rams 23 and 7, might be provided for supplying frame-mounted sheets to the heating station 3 and removing the frames carrying formed sheets from the discharge station 47.

Further modifications will be apparent to those skilled in the art and it is desired, therefore, that the invention be limited only by the scope of the appended claims.

Having thus described my invention, what I claim and desire to secure by Letters Patent is:

1. Apparatus for successively drawing individually framed thermoplastic sheets into a predetermined form comprising a drawing press, unheated forming means operated by said press for engaging the framed sheets one by one, means separate and distinct from said forming means for heating each framed sheet to ductility, conveyor means operable to move a framed sheet from said heating means into operative position with respect to said forming means, means for supplying cooling air to the sheet when formed put into operation by the movement of the forming means into forming position, and a timer put into operation by the movement of the forming means into forming position which, at the end of a predetermined time, acts to terminate the action of said cooling air on the sheet being cooled.

2. Apparatus for successively drawing individually framed thermoplastic sheets into a predetermined form comprising a drawing press, unheated forming means operated by said press for engaging the framed sheets one by one, a heating station into which the framed sheet of thermoplastic material is introduced having positioning means for determining the position of the introduced framed sheet with respect to the station, conveyor means operable to move a framed sheet from said heating means into operative position with respect to said forming means, a timer put into operation by the introduction of the framed sheet into position in the heating station determined by said positioning means for causing said conveyor means to operate after a predetermined time has elapsed to convey the framed heated sheet from the heating station into operative position with respect to said forming means, means for supplying cooling air to the sheet when formed put into operation by the movement of the forming means into forming position, and a timer put into operation by the movement of the forming means into forming position which, at the end of a predetermined time, acts to terminate the action of said cooling air on the sheet being cooled.

3. Apparatus for successively drawing individually framed thermoplastic sheets into a predetermined form comprising a drawing press, unheated forming means operated by said press for engaging the framed sheets one by one, means separate and distinct from said forming means for heating each framed sheet to ductility, conveyor means operable to move a framed sheet from said heating means into operative position with respect to said forming means, means for supplying cooling air to the sheet when formed put into operation by the movement of the forming means into forming position, a timer put into operation by the movement of the forming means into forming position which, at the end of a predetermined time, causes said conveyor means to remove the formed sheet.

4. Apparatus for successively drawing individually framed thermoplastic sheets into a predetermined form comprising a drawing press, unheated forming means operated by said press for engaging the framed sheets one by one, means separate and distinct from said forming means for heating each framed sheet to ductility, conveyor means operable to move a framed sheet from said heating means into operative position with respect to said forming means, means for supplying cooling air to the sheet when formed put into operation by the movement of the forming means into forming position, a timer put into operation by the movement of the forming means into forming position which, at the end of a predetermined time, acts to terminate the action of said cooling air on the sheet being cooled, and conveyor control means operated by said timer at the end of a predetermined interval for effecting the operation of said conveyor means to remove the formed sheet from said press.

5. Apparatus for forming thermoplastic sheet material mounted in frames comprising a heating station, a forming station, a discharge station between said heating station and forming station, guideways on which the framed sheets travel from said heating station to said forming station, guideways extending underneath said first guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, and means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, said forming station comprising a reciprocable ram, a sheet-supporting spring-supported support on which the first said reciprocable pusher pushes the sheet and from which the second said pusher pushes the sheet to the discharge station, said support having positioning means for positioning said sheet in alignment with said ram and maintaining it in alignment with the second mentioned guideways.

6. Apparatus for forming thermoplastic sheet material mounted in frames comprising a heating station, a forming station, a discharge station between said heating station and forming station, guideways on which the framed sheets travel from said heating station to said forming station, guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, time-controlled means for initiating feeding movement of the framed sheet from the heating station toward the forming station after the sheet has been heated a predetermined time, said forming station comprising a reciprocable forming ram and a support having positioning means for positioning said sheet in alignment with said ram and maintaining it in alignment with the second mentioned guideways, means timed with the movement of the reciprocable pushers for initiating forming movement of the forming ram, means timed with respect to movement of the ram for applying an air pressure differential to the sheet being formed, means timed with respect to the ram movement for applying cooling air to the sheet being formed, time-controlled means for controlling the length of the cooling period, means timed with respect to the termination of the cooling period for initiating the return of the pushers to original position, means timed with respect to movement of the pushers for returning the ram to initial position, and means timed with respect to the movement of the pushers for applying strip air to the die.

7. Apparatus for forming thermoplastic sheet material mounted in frames comprising a heating station, a forming station, a discharge station between said heating station and forming station, guideways on which the framed sheets travel from said heating station to said forming station, guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, and means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, said forming station comprising a reciprocable forming ram and a support having positioning means for positioning said sheet in alignment with said ram and maintaining it in alignment with the second mentioned guideways.

8. Apparatus for forming thermoplastic sheet material mounted in frames comprising a heating station, a forming station, a discharge station between said heating station and forming station, guideways on which the framed sheets travel from said heating station to said forming station, guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, and time-controlled means for initiating feeding movement of the framed sheet from the heating station toward the forming station after the sheet has been heated a predetermined time, said forming station comprising a reciprocable forming ram and a support having positioning means for positioning said sheet in alignment with said ram and maintaining it in alignment with the second mentioned guideways.

9. Apparatus for forming thermoplastic sheet material mounted in frames comprising a heating station, a forming station, a discharge station between said heating station and forming station, guideways on which the framed sheets travel from said heating station to said forming station, guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, time-controlled means for initiating feeding movement of the framed sheet from the heating station toward the forming station after the sheet has been heated a predetermined time, said forming station comprising a reciprocable forming ram and a support having positioning means for positioning said sheet in alignment with said ram and maintaining it in alignment with the second mentioned guideways, and means timed with the movement of the reciprocable pushers for initiating forming movement of the forming ram.

10. Apparatus for forming thermoplastic sheet material mounted in frames comprising a heating station, a forming station, a discharge station between said heating station and forming station, guideways on which the framed sheets travel from said heating station to said forming station, guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, time-controlled means for initiating feeding movement of the framed sheet from the heating station toward the forming station after the sheet has been heated a predetermined time, said forming station comprising a reciprocable forming ram and a support having positioning means for positioning said sheet in alignment with said ram and maintaining it in alignment with the second mentioned guideways, means timed with the movement of the reciprocable pushers for initiating forming movement of the forming ram, and means timed with respect to movement of the ram for applying an air pressure differential to the sheet being formed.

11. Apparatus for forming thermoplastic sheet material mounted in frames comprising a heating station, a forming station, a discharge station between said heating station and forming station, guideways on which the framed sheets travel from said heating station to said forming station, guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, time-controlled means for initiating feeding movement of the framed sheet from the heating station toward the forming station after the sheet has been heated a predetermined time, said forming station comprising a reciprocable forming ram, means timed with the movement of the reciprocable pushers for initiating forming movement of the forming ram and a support having positioning means for positioning said sheet in alignment with said ram and maintaining it in alignmet with the second mentioned guideways, means timed with respect to the ram movement for applying cooling air to the sheet being formed, time-controlled means for controlling the length of the cooling period, and means timed with respect to the termination of the cooling period for initiating the return of the pushers to original position.

12. Apparatus for forming thermoplastic sheet material mounted in frames comprising a heating station, a forming station, a discharge station between said heating station and forming station, guideways on which the framed sheets travel from said heating station to said forming station, guideways extending underneath said first guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, and means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, said forming station comprising a reciprocable forming ram and a support having positioning means for positioning said sheet in alignment with said ram and maintaining it in alignment with the second mentioned guideways.

13. Apparatus for forming thermoplastic sheet material mounted in frames comprising a heating station, a forming station, a discharge station, guideways on which the framed sheets travel from said heating station to said forming station, guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, and time-controlled means for initiating feeding movement of the framed sheet from the heating station toward the forming station after the sheet has been heated a predetermined time, said forming station comprising a reciprocable forming ram and a support having positioning means for positioning said sheet in alignment with said ram and maintaining it in alignment with the second mentioned guideways.

14. Apparatus for forming thermoplastic sheet material mounted in frames comprising a heating station, a forming station, a discharge station between said heating station and forming station, guideways on which the framed sheets travel from said heating station to said forming station, guideways extending underneath said first guideways on which the sheets travel from said forming station to said discharge station, a reciprocable pusher for pushing a framed sheet along one of said guideways from the heating station to the forming station, a reciprocable pusher for pushing a framed sheet from the forming station to the discharge station, and means for operating said pushers in unison to cause one of the pushers to feed a framed sheet from the heating station to the forming station by movement of the pushers in one direction and to cause the other pusher to feed a framed sheet from the forming station to the discharge station by movement in the opposite direction, said forming station comprising a reciprocable ram, a support on which the first said reciprocable pusher pushes the sheet and from which the second said pusher pushes the sheet to the discharge station, said support having positioning means for positioning said sheet in alignment with said ram and maintaining it in alignment with the second mentioned guideways.

15. Apparatus for successively drawing individual thermoplastic sheets into a predetermined form comprising a drawing press for drawing the heated sheet into a predetermined form, a discharge station into which the drawn sheet of thermoplastic material is introduced having positioning means for determining the position of the introduced sheet with respect to the station, conveyor means for conveying the heated sheet from the drawing press to the discharge station, and means controlled by the removal of the sheet from its position in the discharge station determined by said positioning means for controlling the further movement of said conveyor into position to convey a succeeding sheet from the drawing press to the delivery station.

GUSTAVE W. BORKLAND.

REFERENCES CITED

The following references are of record in the file of this patent:

UNITED STATES PATENTS

| Number | Name | Date |
|---|---|---|
| 2,160,805 | Winegar | June 6, 1939 |
| 2,229,613 | Strauch | Jan. 21, 1941 |
| 2,230,189 | Ferngren | Jan. 28, 1941 |
| 2,350,175 | Luxenberger | May 30, 1944 |
| 2,373,201 | Smith | Apr. 10, 1945 |
| 2,467,440 | Meharg et al. | Apr. 19, 1949 |
| 2,487,126 | Greer | Nov. 8, 1949 |